UNITED STATES PATENT OFFICE.

EBENEZER MARSH, OF ALTON, ILLINOIS.

IMPROVEMENT IN MANUFACTURE OF CANDLES.

Specification forming part of Letters Patent No. 2,600, dated April 30, 1842.

*To all whom it may concern:*

Be it known that I, EBENEZER MARSH, of the city of Alton and State of Illinois, have invented a new and Improved Mode of Making Candles from Castor-Oil; and I do hereby declare that the following is a full and exact description.

The nature of my invention and manner of operating is as follows: About six ounces (the precise amount not material) of strong nitric acid is added to a gallon of castor-oil and the same thoroughly mixed by stirring them together for several times for the first twenty-four hours, then letting the same stand for six or eight days, or until it becomes sufficiently hard; or the process may be expedited by heating and stirring the same together when first mixed, and then suffering it to stand until it becomes sufficiently hard. It is then shaved up fine and washed with water slightly alkaline by adding a small quantity of sub-carbonate of potassa or other alkali to destroy and wash out the superfluous acid, and then thoroughly dried by exposure of the same in the sun and air, or by artificial heat for one or more days, after which it may be molded in the usual manner of molding candles. The same is applicable to other expressed vegetable oils.

What I claim as my invention, and desire to secure by Letters Patent, is—

The process herein described of hardening expressed vegetable oils by acids for the purpose of making candles.

EBENEZER MARSH.

Witnesses:
S. PINSON, Jr.,
RICHARD FLAGG.